United States Patent
Cohen et al.

(10) Patent No.: US 9,451,187 B2
(45) Date of Patent: Sep. 20, 2016

(54) LENS SHADING CALIBRATION FOR CAMERAS

(71) Applicant: NVIDIA Corporation, Santa Clara, CA (US)

(72) Inventors: Noy Cohen, Stanford, CA (US); Ricardo J. Motta, Palo Alto, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/732,211

(22) Filed: Dec. 31, 2012

(65) Prior Publication Data

US 2014/0184813 A1 Jul. 3, 2014

(51) Int. Cl.
*H04N 5/357* (2011.01)
*H04N 5/225* (2006.01)

(52) U.S. Cl.
CPC .......... *H04N 5/3572* (2013.01); *H04N 5/2257* (2013.01)

(58) Field of Classification Search
CPC .................... H04N 5/3572; H04N 5/2257
USPC .................................. 348/251, 187
See application file for complete search history.

(56) References Cited

U.S. PATENT DOCUMENTS

| | | | |
|---|---|---|---|
| 2006/0056082 A1* | 3/2006 | Hung | 359/819 |
| 2010/0165144 A1 | 7/2010 | Lee | |
| 2010/0265358 A1* | 10/2010 | Cabral et al. | 348/223.1 |
| 2010/0271503 A1* | 10/2010 | Safaee-Rad et al. | 348/223.1 |
| 2011/0058072 A1 | 3/2011 | Wang et al. | |
| 2012/0314086 A1* | 12/2012 | Hubel et al. | 348/175 |

FOREIGN PATENT DOCUMENTS

TW 201004370 1/2010

* cited by examiner

*Primary Examiner* — Nhan T Tran
*Assistant Examiner* — Chan Nguyen

(57) ABSTRACT

Embodiments of the present invention are directed to methods and systems for performing automatic lens shading correction using module-specific calibrations. According to one aspect of the invention, a method is provided that is performed over three main stages. During a first stage, radial symmetric component data is determined that is common to camera modules of the type to be calibrated. During the second stage, the actual measurement of the shading profile of one or more specific camera modules is performed. In the third and final stage is the extrapolation stage, the base measurement surfaces of a camera module type determined in the first stage are extrapolated and modified with the module-specific Bezier correction surface and calibration data of the second stage. The output surfaces of this third and final stage are used to correct for the shading profile in the camera module, depending on the light-source estimation.

38 Claims, 6 Drawing Sheets

LENS SHADING CALIBRATION FOR CAMERAS

BACKGROUND

Image acquisition devices such as camera modules are commonly integrated into various other mobile computing devices, such as smartphones or tablet computers. Typically, camera modules integrated into mobile computing devices are implemented as one or more substantially cube-like modules. The recent trend of minimizing the width or thickness of the underlying mobile computing devices has resulted in a similar trend of minimizing the height of the integrated camera modules by necessity.

Unfortunately, due the compacted height of the integrated camera modules, the incident light rays at more extreme angles are received, relative to less compact systems. This can result in an undesirable effect (called lens shading) where images are produced with heightened brightness in the center and substantially less brightness towards the edges.

Contemporary photographic techniques have been able to account for, and mitigate this effect. Typically, lens shading corrections are performed by programming coefficients into each manufactured camera module that are subsequently applied to image data. However, since the amount of lens shading is dependent on the source of light (or "illuminant") detected in the scene (typically determined through a process of white balancing), the amount of programmed coefficients can be significant.

Moreover, actual calculation of the coefficients traditionally requires extensive measurement and calibration specific to each camera module. That is, coefficient determination conventionally requires the generation of several models of camera module "surfaces," with the actual amount of surfaces corresponding to the number of illuminants that an image can be captured in. Conventional techniques for generating these surfaces include generating a plurality of images with each camera module under a plurality of lighting conditions. This can comprise upwards of ten or more images per module unit, and requires facilities for producing each of the supported lighting conditions. As a result, traditional lens shading calibration techniques can be a very inefficient process, requiring substantially intensive amounts of time and effort, particularly for units that are mass-produced.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the present invention are directed to methods and systems for performing automatic lens shading correction using module-specific calibrations. According to one aspect of the invention, a method is provided that is performed over three main stages.

During a first stage, radial symmetric component data is determined from testing that is common to camera modules of the type to be calibrated. According to various embodiments, this stage may be performed offline (e.g., in a lab), and independently of the per-module factory-floor measurement and calibration process (i.e., the second stage). The extracted data is used to generate base surface measurements of the image acquisition components (e.g., lens, filters, sensors) for a set of scene illuminants, and shared among the camera modules of the camera module type. This data may be stored in a memory or included in a software (such as a driver) loaded in, and used to interact with, each of the camera modules.

During the second stage, the actual measurement of the shading profile of one or more specific camera modules is performed. According to embodiments, this measurement may be performed during production, as part of each camera module's calibration process, for example. A calibration surface is generated from the resultant measurement data in each specific camera module. The calibration surface may be stored in that module's memory (e.g., in a one-time programmable memory of the module), or by some other method that makes it available to the camera driver. This calibration surface may be expressed as a module-specific Bezier correction surface under a pre-determined light source or illuminant, according to various embodiments.

The third and final stage is the extrapolation stage. In this stage, the base measurement surfaces of a camera module type determined in the first stage are extrapolated and modified with the module-specific Bezier correction surface and calibration data of the second stage. According to an embodiment, the third and final stage is performed in the camera module itself (e.g., by a driver). In further embodiments, this stage may be performed during the boot sequence of the camera module—or the underlying computing device (e.g., mobile phone). The output surfaces of this stage are used to correct for the shading profile in the camera module, depending on the light-source estimation. For example, once an image of a scene is captured by the camera module, the illuminant(s) present in the scene are determined (via a process of white-balancing, typically). Once the illuminant(s) present are detected, the corrected lens shading surface corresponding to the detected illuminant(s) are referenced, and coefficients from the corrected lens shading surface are applied to the pixel values to correct lens shading effects.

By initially determining base measurement surfaces for an entire module type and applying module-specific calibration acquired from single captured images, the various embodiments of the present invention are able to avoid the extensive, tedious, and time intensive calibration for individual modules typical of conventional techniques while still maintaining effective lens-shading correction on acquired image data.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
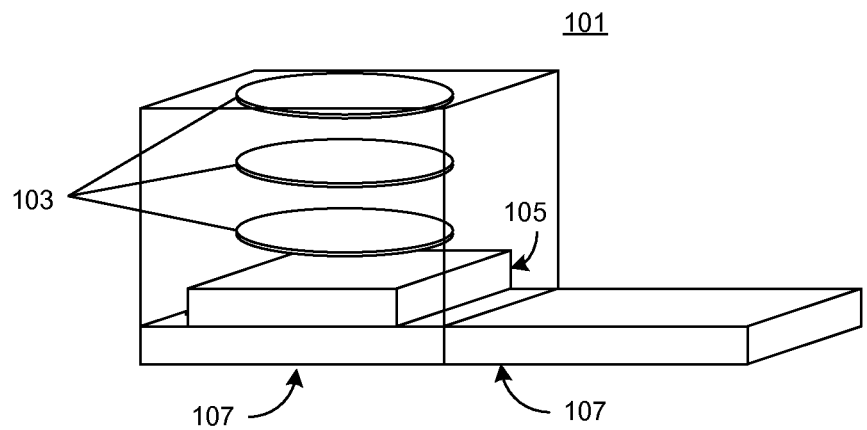
FIG. 1 depicts an exemplary illustration of an image capture device, in accordance with an embodiment of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying," "generating," "measuring," "creating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Camera Module and Operating Environments

Embodiments of the claimed subject matter are directed to methods and systems for performing module-specific automatic lens shading correction for images captured using an image-capture device. FIG. 1 depicts an exemplary illustration of an image capture device 100 in accordance with an embodiment of the present invention. As presented in FIG. 1, the image capture device 100 may be implemented as a camera module 101 of a camera module type may include a plurality of lenses 103, an image sensor 105 mounted on a substrate 107, and a circuit 109. According to various embodiments, the camera module 101 may be wholly or partially encapsulated within a larger mobile computing device, such as a digital camera, smartphone, personal data assistant, e-reader, tablet or laptop computer, etc. As shown, camera module 101 is depicted with a plurality of lenses 103 positioned in series. In further embodiments, one or more filters (e.g., infrared filters) may be disposed below, above, and/or in between two or more of the plurality of lenses 103. As presented in FIG. 100, the series of lenses 101 is positioned over an image sensor 105, configured to receive incident input (light) through the lens. The image sensor 105 itself may be implemented as a photo diode, for example, and may be disposed over a substrate 105. In some embodiments, the substrate 105 may be substantially composed of silicon dioxide ($SiO_2$). Circuit 109 may, in some embodiments, be implemented as a connection terminal through which data can be transmitted between the image sensor 105 to one or more other components (not shown) such as a memory and/or processor.

Figure 2:
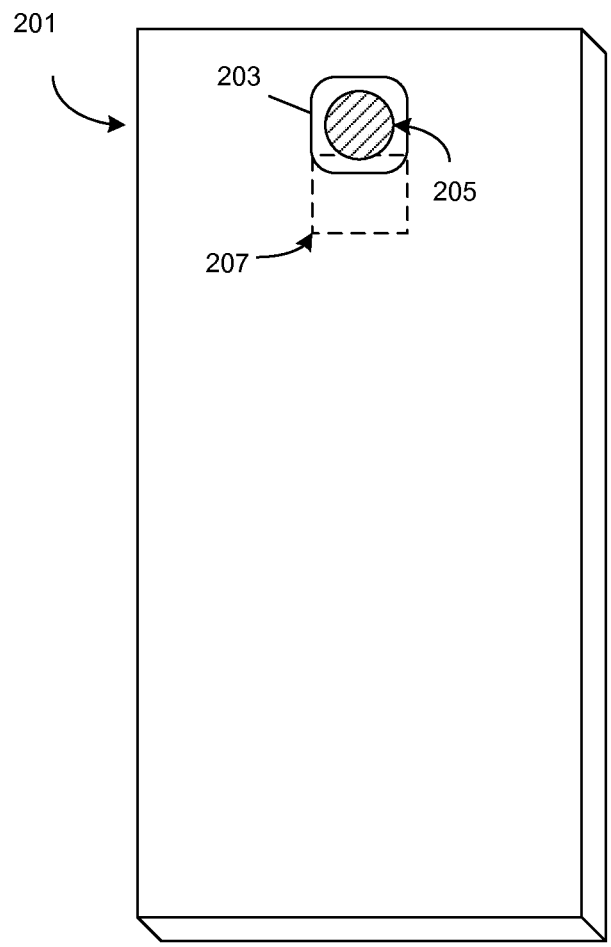
FIG. 2 shows an exemplary illustration of a camera module disposed in a mobile computing device, in accordance with an embodiment of the present invention

FIG. 2 shows an exemplary illustration of a camera module disposed in a mobile computing device 200, in accordance with an embodiment of the present invention. As presented in FIG. 2, the mobile computing device 200 is implemented as mobile telephone, such as a smartphone 201. According to various embodiments, the smartphone 201 is equipped with a camera module 203, such as the image capture device 100 described above. As depicted, a substantial portion (indicated by the dotted line portion) of the camera module 203 is enclosed within the structure of the smartphone 201. In some embodiments, only a top lens 205 of the camera module 203 may be exposed, allowing access to input (light rays). All other portions of the camera module 203, such as an image sensor (not shown) or connection terminal 207 may be enclosed by, or otherwise substantially obstructed from external access by the smartphone 201. As presented in FIG. 200, smartphone 201 may be used to capture photographic images via camera module 203. Control of the camera module 203 may be managed through a user interface of smartphone 201, such as through physical buttons, or on-screen graphical user interfaces depicted in a display of smartphone 201. In still further embodiments, usage of certain hardware resources such as memory and/or one or more processors in smartphone 201 may be shared with camera module 203 for image acquisition and production purposes.

Figure 3:
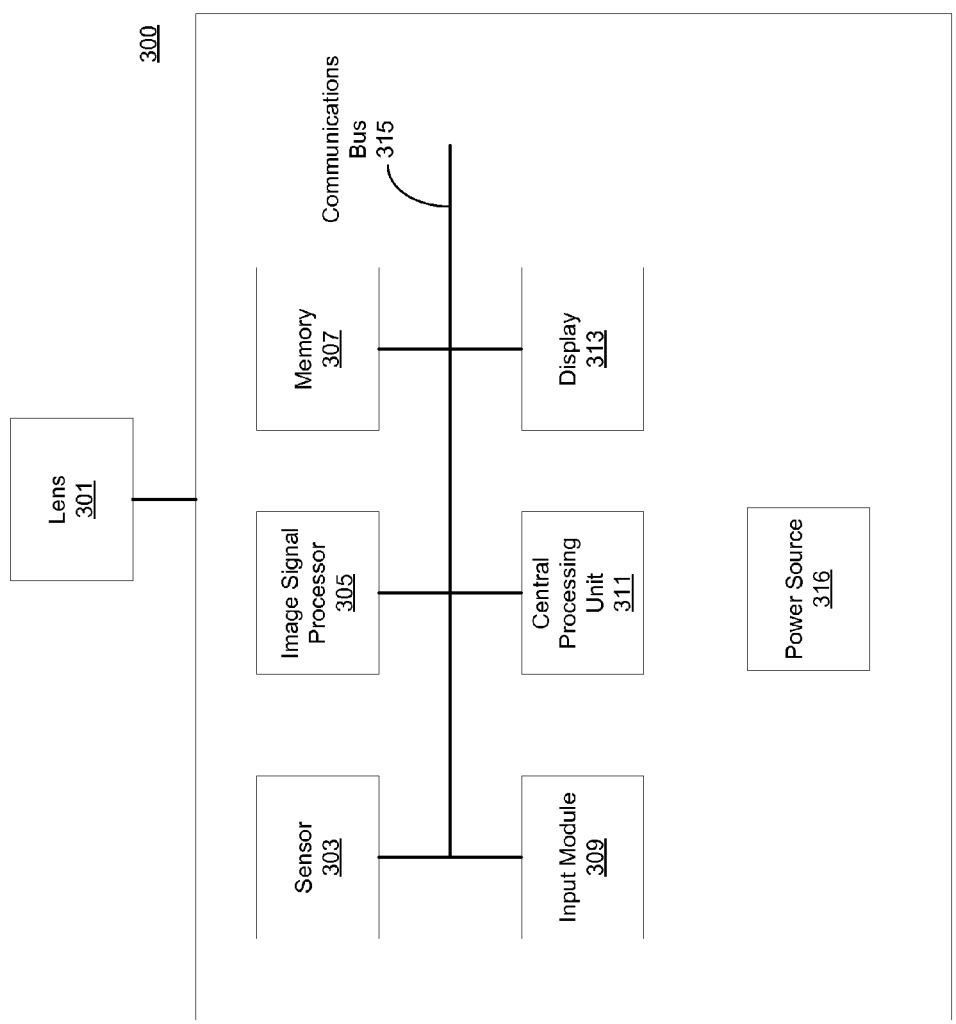
FIG. 3 depicts an exemplary operating environment in which various embodiments of the present invention may be performed, in accordance with various embodiments of the present invention.

FIG. 3 depicts an illustration of an exemplary operating environment in accordance with one embodiment of the present invention. Digital system 300 depicts the components of a basic system in accordance with embodiments of the present invention providing the execution platform for certain hardware-based and software-based functionality. Although specific components are disclosed in system 300 it should be appreciated that such components are examples. That is, embodiments of the present invention are well suited to having various other components or variations of the components recited in system 300. It is appreciated that the components in system 300 may operate with other components other than those presented, and that not all of the components of system 300 may be required to achieve the goals of system 300.

In a typical embodiment, System 300 includes sensor 303, image signal processor (ISP) 305, memory 307, input module 309, central processing unit (CPU) 311, display 313, communications bus 315, and power source 316. Power source 316 supplies power to system 300 and may, for example, be a DC or AC power source. CPU 311 and the ISP 305 can also be integrated into a single integrated circuit die and CPU 311 and ISP 305 may share various resources, such as instruction logic, buffers, functional units and so on, or separate resources may be provided for image processing and general-purpose operations. System 300 can be implemented as, for example, a digital camera, a tablet, cell phone camera, portable device (e.g., audio device, entertainment device, handheld device), webcam, video device (e.g., camcorder) and the like.

Sensor 303 receives light via a lens 301 and converts the light received into a signal (e.g., digital or analog). According to some embodiments, lens 301 may be permanently attached to the system 300. Alternatively, lens 301 may be detachable and interchangeable with lens of other properties. These properties may include, for example, focal lengths, apertures and classifications. In typical embodiments, lens 301 may be constructed of glass, though alternate materials such as quartz or molded plastics may also be used. Sensor 303 may be any of a variety of optical sensors including, but not limited to, complementary metal-oxide-semiconductor (CMOS) or charge-coupled device (CCD) sensors. Sensor 303 is coupled to communications bus 315 and may provide image data received over communications bus 315. In further embodiments, sensor 303 includes light intensity sensing capability, and the image data received may include data corresponding to the determined intensity of the light in a scene or image.

Image signal processor (ISP) 305 is coupled to communications bus 315 and processes the data generated by sensor 303. More specifically, image signal processor 305 processes data from sensor 302 for storing in memory 307. For example, image signal processor 305 may compress and determine a file format for an image to be stored in within memory 307.

The input module 309 allows the entry of user-input into system 300 which may then, among other things, control the sampling of data by sensor 303 and subsequent processing by ISP 305. Input module 309 may include, but is not limited to, navigation pads, keyboards (e.g., QWERTY), buttons, touch screen controls (e.g., via display 313) and the like.

The central processing unit (CPU) 311 receives commands via input module 309 and may control a variety of operations including, but not limited to, sampling and configuration of sensor 303, processing by ISP 305, and management (e.g., the addition, transfer, and removal) of images and/or video from memory 307.

Creating a Base Surface for Each Type of Illumination

Figure 4:
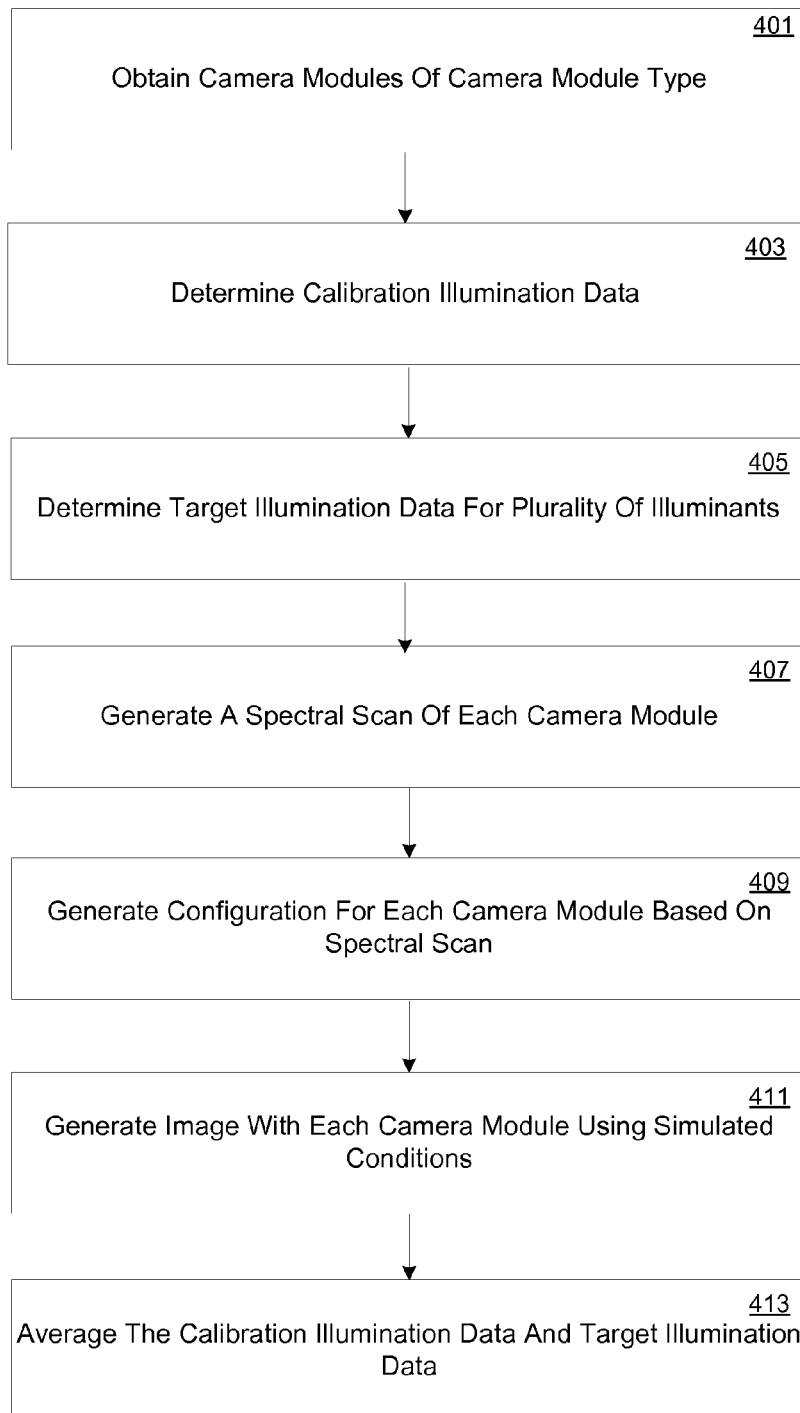
FIG. 4 depicts a flowchart of an exemplary computer implemented process for creating base surface measurements for a plurality of illuminants, in accordance with various embodiments of the present invention

FIG. 4 depicts a flowchart 400 of an exemplary computer implemented process for creating base surface measurements for a plurality of illuminants, in accordance with various embodiments of the present invention. In one embodiment, the process may be performed in a lab, offline, and independent of per-module factory floor measurement and calibration processes. Steps 401-413 describe exemplary steps of the flowchart 200 in accordance with the various embodiments herein described. The purpose of this stage is to generate base surface measurements that represent the mostly-radial symmetric response common to all modules of a certain type (i.e. with the same shading profile, excluding production variations).

At step 401, number of typical modules are obtained and analyzed. The modules may be obtained as a set from the production line for example, and may represent standard variations in production. According to some embodiments, a statistically significant number, for example 50-100 modules, may be obtained and analyzed during this step.

At step 403 spectral scans are obtained of the (pre-determined) light source used to measure the modules during a factory-floor calibration (e.g., the "calibration illuminant"). Likewise, at step 405, spectral scans are obtained of the light sources for which a shading correction surface ("target illuminants") is desired. These light sources may correspond with a pre-determined set of illuminants that may be determined and used to adjust color values in an acquired image during an automatic white-balancing procedure performed in an image capture device. According to various embodiments, the set of illuminants may include (but are not limited to) natural sun light, fluorescent illuminants, tungsten illuminants, or hybrid light sources combining two or more illuminants. In an alternate embodiment, the spectral scans corresponding to the calibration illumination and target illuminations may be previously generated, performed outside of process 400, and stored as data in a data storage device (e.g., a database). According to these implementations, the data from the spectral scans corresponding to the calibration illumination and target illuminants may be referenced instead, at steps 403 and 405, respectively.

According to further embodiments, each module of the module type may be scanned at step 407 by a monochromator to generate a spectral scan of the module with sufficient wavelength resolution. A scan may include, for example, measurements of the black level offset and scans from 300 [nm] to 800 [nm] and having 5 nm resolution. Once the scans of the camera modules are available from the monochromator, a configuration for each module is generated at step 409. The configuration may be generated by executing an automatic calibration process for each module via software-implemented tools, and determining the configuration of the module post-calibration, for example. At step 411, each camera module is then used to generate an image under conditions simulated to correspond to the calibration illumination and for each type of target illuminant. The generated images are then stored as data (e.g., as a file). In some embodiments, the data may be stored as a raw image (or RAW) file.

The base surfaces for each type of illumination are generated by averaging the images generated in step 411 over the plurality of modules at step 413. Generation of the averages may be performed, in some embodiments, automatically, also via software-implemented tools. In one embodiment, the averages may be calculated via executing a script that loops over the data of the target illuminant and the camera modules (in a directory, for instance), and for each module, loads the generated image corresponding to each illuminant, sums the image data with the same image from other modules and stores the result as a surface of measurement data. The resulting surface is the base surface for the specific illuminant.

According to various embodiments, the data representing the base surface may be stored in a memory in and/or corresponding to the camera module. In further embodiments, the base surface data may be written to the software drivers used to interact with the camera module in a mobile computing device, such as a digital camera, smart-phone, personal data assistant, e-reader, tablet or laptop computer, etc. For each base surface, a Bezier representation is created by calibrating the base surfaces specifically for each module. In an embodiment, an output of the calibration results in calculation of Bezier coefficients for one type of illumination, and is described in greater detail below.

Figure 5:
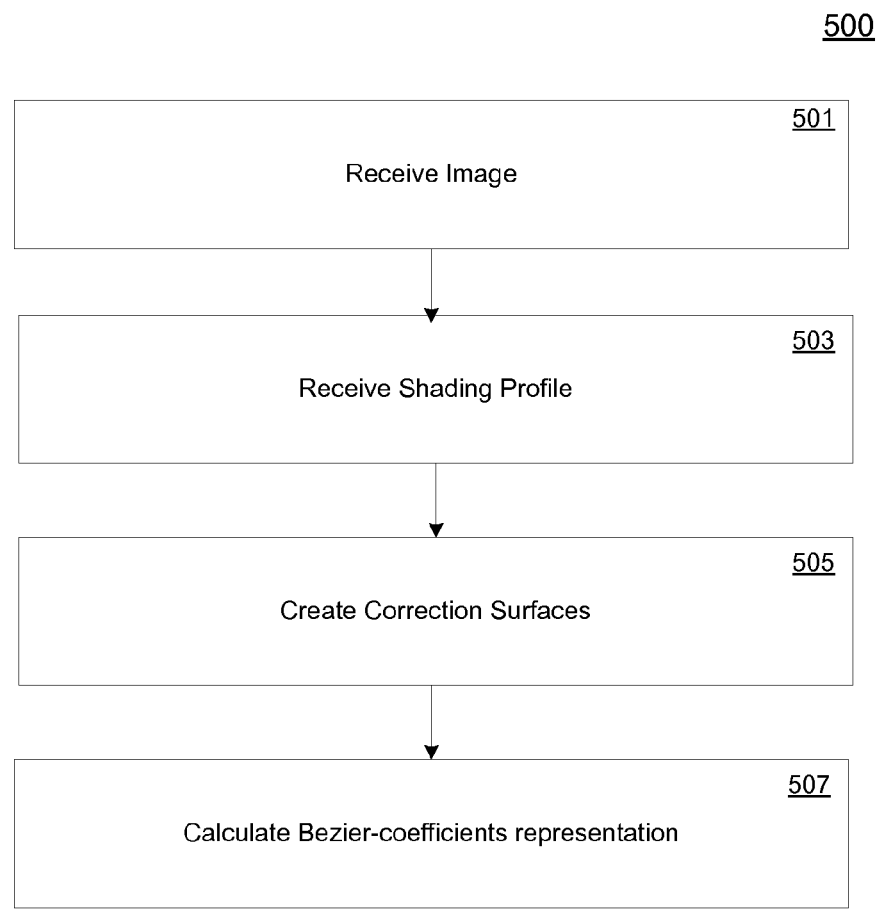
FIG. 5 depicts a flowchart of an exemplary process for measuring the shading profile of a specific module during factory floor calibration, in accordance with various embodiments of the present invention.

Measuring the Shading Profile of a Specific Module During Factory Floor Calibration FIG. 5 depicts a flowchart 500 of an exemplary process for measuring the shading profile of a specific module during factory floor calibration, in accordance with various embodiments of the present invention. In one embodiment, the process is performed during a manufacturing production of a camera module. Steps 501-507 describe exemplary steps of the flowchart 500 in accordance with the various embodiments herein described. According to an aspect, flowchart 500 is performed during the second of three stages performed to generate module-specific corrected surface measurements for a camera module for automatic lens shading correction. The purpose of this stage is to generate a Bezier shading correction surface for a specific module under one light source during factory-floor calibration. According to some embodiments, steps 501-507 may be performed using software-implemented tools executing in a computing system.

As presented in FIG. 5, the process depicted in flowchart 500 begins at step 501 by receiving as input an image of a uniform flat-field scene, captured with a specific module for which the calibration is performed, under a known light source (the calibration illumination described above with respect to FIG. 4). In some embodiments, the image may be referenced from an external source (e.g., from a database). In still further embodiments, the image may be preprocessed to exhibit certain characteristics. These characteristics may include, for example, the subtraction of a black level in the image and/or the elimination of "bad" pixels or other sensor artifacts from the image. In still further embodiments, the image may be accompanied by a sub-sampled version of the full resolution version.

At step 503, the shading profile of the camera module is received. In some embodiments, the shading profile of the camera module may be stored in the memory of the module itself. Alternately, the shading profile of the module may be referenced from an accessible storage device, such as a database. In some embodiments, the shading profile of a camera module may be modeled as a combination of two components. The first component is radial and largely rotationally-symmetric. The relative illumination (RI) characteristics of the lens, the sensor's chief ray angle (CRA) profile and the infrared (IR) filter spectral response as a function of the incident angle are the main contributors to the shape of the radial component. As such, this component is strongly dependent on the type of illumination, and ideally does not vary significantly in production. The second component is non radial in nature, and may include a horizontal/diagonal intensity gradient that is different for each color channel, resulting in color-shading effect across the field of view. This component is mostly the result of u-lenses array misalignment (compared with the lens's chief ray angle profile) and also, to some extent, of a non-uniformity in pixel response. This component is assumed to be largely independent of the illumination to a good approximation.

At step 505, correction surfaces for each color channel in the image received in step 501 are created from the shading profile of the camera module received in step 503. In one embodiment, a correction surface is created by finding the maximal value in each color channel and for each pixel in the image, and dividing it by the color value of the pixel value. In some embodiments a fall-off factor can be applied as needed to modify the correction surface. The fall-off factor may be implemented, in some embodiments, as a quadratic function of the distance from the center of the image (or the radius). In still further embodiments, optional color imbalance may be further tuned. For example, to correct for green-channels imbalance, a lower green channel in the shading profile may be multiplied by the ratio between the higher green channel and the lower one.

At step 507, a Bezier-coefficients representation of these surfaces is calculated. To do that, the surface is first divided into a plurality of sub-sections whose sizes are determined based on the configuration of the camera module (determined in step 409 of flowchart 400). Next, a least-square optimization is performed in each sub-section to determine one or more Bezier coefficients that describe the surface. Determining the Bezier coefficients may be performed by (but not constrained to) the following steps:

a. Calculate the sub-section sizes. Typically, standard sub-section sizes are chosen.
b. Calculate the chrominance (e.g., u, v) values at each pixel in the image which correspond to the patches sizes.
c. Calculate the $3^{rd}$ degree Bezier polynomials from the chrominance values.
d. For each color channel, build an over-constrained linear system in which 100 Bezier coefficients are the variables (the vector x) and the number of equations is the number of pixels in the correction surface (the vector b). In one embodiment, the system may be expressed as Ax=b, where the matrix A holds the $3^{rd}$ degree Bezier polynomials elements that is multiplied by the Bezier coefficients in order to approximate the surface. A is assumed to be skinny and full rank (i.e. there are more surface points than Bezier coefficients and it is not deficient).
e. From the equation Ax=b, the optimization problem $$\min_{x}(\|Ax - b\|_2)$$
$$x \geq 0$$

is defined and solved by calculating the least-squares approximate solution—$\hat{x} = (A^T A)^{-1} A^T b$.

f. Scale the integer and fractional part of the coefficients to match the desired output resolution.

Once calculated, the Bezier-coefficients may be stored as data (e.g., as a configuration file) and programmed in a memory of the camera module. According to some embodiments, this data is stored in a one time programmable memory of the camera module. In addition to the shading surfaces, the maximal value of each color channel may be calculated and used for automatic white-balancing.

Figure 6:
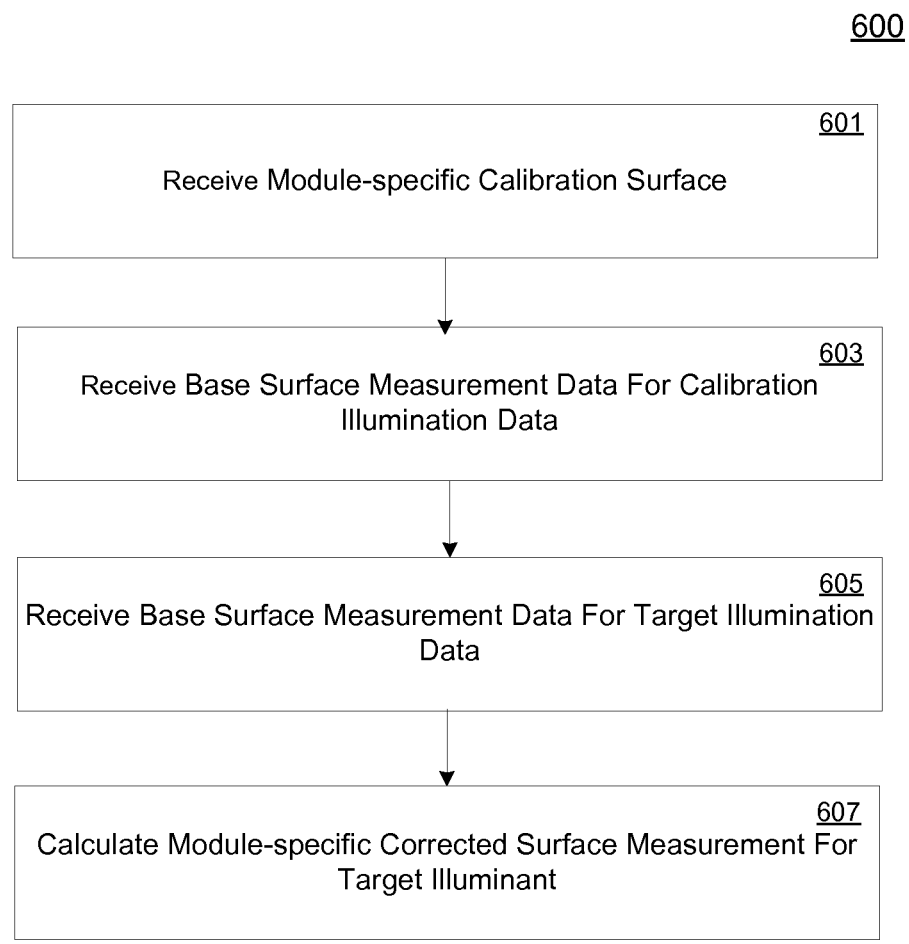
FIG. 6 depicts a flowchart of an exemplary process for creating a lens shading surface for an arbitrary light source using a calibration surface and a base surface, in accordance with various embodiments of the present invention.

Creating a Lens Shading Surface for an Arbitrary Light Source Using a Calibration Surface and a Base Surface FIG. 6 depicts a flowchart 600 of an exemplary process for creating a lens shading surface for an arbitrary light source using a calibration surface and a base surface, in accordance with various embodiments of the present invention. Steps 601-607 describe exemplary steps of the flowchart 500 in accordance with the various embodiments herein described. According to an aspect, flowchart 600 is performed during the last of three stages performed to generate module-specific corrected surface measurements for a camera module for automatic lens shading correction. The purpose of this stage is to generate a module-specific Bezier shading correction surface (or several surfaces) for a target illumination (a "target Bezier surface"), using data collected in the first two stages—a module-specific calibration surface that was measured under calibration illumination during the factory-floor calibration stage (a "calibration Bezier surface"), and at least two base surfaces the calibration illumination and the target illumination surfaces calculated in the first stage.

In one embodiment, the process is performed by a driver during the boot process of a mobile computing device in which a camera module is comprised. The calibration data, unique to the camera module, is read by the driver during boot at step 601. At step 603, the driver also reads the base surface data that matches the calibration illumination ("base calibration surface") and (at step 605) the base surface that matches the target illumination ("base target surface")—both are represented in Bezier coefficients and burned into memory which is accessible by the driver.

Generation of the target Bezier surface may be performed using the base surface measurements determined in FIG. 400 according to the following mathematical—for each of the Bezier-coefficients, calculate (in Bezier domain):

$$targetBezierSurface(i) = \\ calibrationBezierSurface(i) \cdot \frac{BaseTargetSurface(i)}{BaseCalibrationSurface(i)}.$$

In some embodiments, configurable falloff factor may be applied that controls the desired light falloff of the final target Bezier surface. In order to implement the falloff in the Bezier domain, the driver may generate a symmetric shading profile that matches the spatial locations of the Bezier coefficients over the field of view and multiply each coefficient by an appropriate falloff factor. These factors may be generated by calculating the squared radius at each spatial location of each Bezier coefficient (relative to the center of the image) and then calculating:

$$falloff(i) = 1 - \frac{r(i)^2}{\max(r(i)^2)} \frac{(100 - factor)}{100}.$$

The resultant output is applied by multiplying the falloff factor to each coefficient of the calibration Bezier surface, and may be expressed as:

$$targetBezierSurface(i) = \\ falloff(i) \cdot calibrationBezierSurface(i) \cdot \frac{BaseTargetSurface(i)}{BaseCalibrationSurface(i)}.$$

The output surfaces of this third and final stage are used to correct for the shading profile in the camera module, depending on the light-source estimation. For example, once an image of a scene is captured by the camera module, the illuminant(s) present in the scene are determined (via a process of white-balancing, typically). Once the illuminant(s) present are detected, the corrected lens shading surface corresponding to the detected illuminant(s) are referenced, and coefficients from the corrected lens shading surface are applied to the pixel values to correct for lens shading effects.

Accordingly, embodiments of the present invention as described herein provide an efficient alternative to traditional approaches to performing automatic lens shading calibrations and correction. By initially determining base measurement surfaces for an entire module type and applying module-specific calibration acquired from single captured images, the various embodiments of the present invention are able to avoid the extensive, tedious, and time intensive calibration for individual modules typical of conventional techniques while still maintaining effective lens-shading correction on acquired image data.

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method for performing lens shading correction, the method comprising:
   generating a plurality of base surface measurements of a camera module type;
   receiving a shading profile specific to each camera module of the camera module type, the shading profile comprising a radial component and a non-radial component;
   calculating a module-specific calibration surface based on a corresponding shading profile; and
   creating a module-specific corrected surface measurement for each illuminant of the plurality of illuminants based on the plurality of base surface measurements of the camera module type and the module-specific calibration surface,
   wherein, each camera module of the plurality of camera modules is operable to be used in a mobile computing device,
   further wherein the plurality of base surface measurements are generated based on a plurality of spectral scans and a plurality of images under a plurality of simulated conditions based on a target illuminant and a calibration illuminant.

2. The method according to claim 1, further comprising:
   capturing a scene with a first camera module of the plurality of camera modules;
   determining an illuminant in the scene captured by the first camera module; and
   applying the module-specific corrected surface measurement corresponding to the determined illuminant to image data corresponding to the scene.

3. The method according to claim 1, wherein the generating the base surface measurement is performed offline and independently of the measuring a shading profile specific to each camera module of the camera module type.

4. The method according to claim 1, wherein the base surface measurement is stored in a memory, the memory being accessible to a camera driver executing in a processor and configured to interact with the camera module.

5. The method according to claim 1, wherein the radial component of the shading profile comprises at least one of:

a plurality of relative illumination characteristics of a lens comprised in the camera module;
a profile of a chief ray angle of a sensor comprised in the camera module;
a spectral response of an infrared filter comprised in the camera module.

6. The method according to claim 1, wherein the generating the base surface measurement further comprises at least one of:
obtaining a plurality of camera modules of the camera module type;
determining a calibration illumination data;
determining a target illumination data for the plurality of illuminants;
generating the plurality of spectral scans;
generating a configuration for each camera module based on a spectral scan;
generating the plurality of images under the plurality of simulated conditions, the plurality of simulated conditions being based on the target illumination data and the calibration illumination data; and
averaging the plurality of images of the plurality of camera modules.

7. The method according to claim 6, wherein the generating the plurality of spectral scans of the camera module comprises scanning the plurality of camera modules with a monochromator.

8. The method according to claim 6, wherein the plurality of images are stored as a raw image format (RAW) file.

9. The method according to claim 6, wherein the plurality of spectral scans comprises a spectral scan of a calibration light source used to measure the plurality of camera modules during a factory-floor calibration.

10. The method according to claim 9, wherein the plurality of spectral scans comprises a spectral scan of each illuminant of the plurality of illuminants.

11. The method according to claim 10, wherein the creating a module-specific corrected surface measurement comprises:
receiving the module-specific calibration surface;
receiving a base surface measurement data corresponding to the calibration illuminant;
receiving the base surface measurement data corresponding to a target illuminant; and
calculating the module-specific corrected surface measurement for the target illuminant based on the module-specific calibration surface, the base surface measurement data corresponding to the calibration illuminant, and the base surface measurement data corresponding to the target illuminant.

12. The method according to claim 11, wherein the module-specific calibration surface comprises a Bezier shading correction surface measurement, further wherein measuring a shading profile specific to each camera module of the camera module type comprises generating the Bezier shading correction surface for the camera module under the calibration illuminant.

13. The method according to claim 12, wherein the measuring a shading profile specific to each camera module is performed during a factory-floor calibration of the camera module.

14. The method according to claim 12, wherein the generating the Bezier shading correction surface comprises receiving, as input, an image of a uniform flat-field scene captured with the camera module, the image of the uniform flat-field scene comprising a plurality of pixels, each pixel of the plurality of pixels having a pixel value for each of a plurality of color channels.

15. The method according to claim 14, wherein the shading profile of a camera module comprises an intensity gradient for each of the plurality of color channels.

16. The method according to claim 14, wherein the generating the Bezier shading correction surface comprises:
receiving the shading profile of the camera module;
creating a plurality of correction surfaces based on the shading profile, each correction surface of the plurality of correction surfaces corresponding to a color channel of the plurality of color channels; and
calculating a Bezier-coefficients representation for the plurality of correction surfaces.

17. The method according to claim 16, wherein the creating a plurality of correction surfaces comprises:
finding a maximal value in each color channel of the plurality of color channels; and
for each pixel of a plurality of pixels, dividing the maximal value by the color value of the pixel.

18. The method according to claim 16, wherein the generating the Bezier shading correction surface further comprises correcting for an imbalance in green channels by multiplying a lower green channel of the plurality of color channels by a ratio of a higher green channel of the plurality of color channels and the lower green channel.

19. The method according to claim 16, wherein the calculating a Bezier-coefficients representation for the plurality of correction surfaces comprises:
dividing each correction surface into a plurality of sub-divisions;
performing a least-square optimization in each of the plurality of sub-divisions; and
determining a set of Bezier coefficients from the least-square optimizations.

20. The method according to claim 19, wherein the calculating the module-specific corrected surface measurement for the target illuminant is performed for each of the set of Bezier coefficients.

21. The method according to claim 19, wherein the calculating the module-specific corrected surface measurement for the target illuminant comprises:
generating a symmetric shading profile that matches a plurality of spatial locations corresponding to the set of Bezier coefficients;
calculating a plurality of falloff factors corresponding to the set of Bezier coefficients; and
multiplying each Bezier coefficient of the set of Bezier coefficients by a corresponding falloff factor of the plurality of falloff factors.

22. The method according to claim 21, wherein the calculating a plurality of falloff factors corresponding to the set of Bezier coefficients comprises calculating a squared radius at a spatial location of each Bezier coefficient of the set of Bezier coefficients relative to a center of the image.

23. The method according to claim 1, wherein the creating a module-specific corrected surface measurement for each illuminant of the plurality of illuminants is performed in a driver of the camera module.

24. The method according to claim 1, wherein the creating a module-specific corrected surface measurement for each illuminant of the plurality of illuminants is performed during a boot process of the mobile computing device in which the camera module is comprised.

25. The method according to claim 1, wherein the module-specific corrected surface measurements for the plurality of camera modules are stored in a memory of the mobile computing device, the memory being accessible to the driver of the camera module.

26. The method according to claim 1, wherein the module-specific calibration surface is stored in a one-time programmable memory in the mobile computing device.

27. The method according to claim 1, wherein the shading profile is measured during factory floor calibration of a camera module of the camera module type.

28. The method according to claim 1, wherein the radial component is substantially rotationally-symmetric.

29. The method according to claim 1, wherein the radial component is dependent on the type of illumination of the plurality of illuminants.

30. The method according to claim 1, wherein the non-radial component is substantially independent of the type of illumination of the plurality of illuminants.

31. The method according to claim 1, wherein the non-radial component of the shading profile comprises a horizontal/diagonal intensity gradient that is different for each color channel of a plurality of color channels.

32. An image capture device, said device comprising:
an image capture module comprising a lens, an image sensor and an image signal processor, the image capture module being configured to generate an image of a scene comprising a set of image data;
a memory, communicatively coupled to the image capture module, and configured to store the set of image data and a plurality of programmed instructions; and
a processor, communicatively coupled to the memory, and configured to execute the plurality of programmed instructions and to perform a lens shading correction method on the set of image data, the method comprising:
i) referencing a plurality of base surface measurements corresponding to a type of the image capture module and a shading profile specific to the image capture module to create a plurality of module-specific corrected surface measurements;
ii) determining an illuminant present in the scene;
iii) selecting a module-specific corrected surface measurement from the plurality of module-specific corrected surface measurements to correspond to the illuminant; and
iv) applying the selected module-specific corrected surface measurement to the image data,
wherein the plurality of base surface measurements are generated from a spectral scan of the image capture module corresponding to the type of the image capture module and a plurality of images generated under a plurality of simulated conditions based on a target illumination data and a calibration illumination data,
further wherein the shading profile comprises a radial component and a non-radial component.

33. The device according to claim 32, wherein the device comprises a mobile telephone.

34. The device according to claim 32, wherein the image data is preprocessed to subtract a black level in the image.

35. The device according to claim 32, wherein the image data is preprocessed to eliminate sensor artifacts from the image.

36. The device according to claim 32, wherein the image data comprises a full resolution version of the image and a sub-sampled version of the image.

37. A non-transitory computer readable medium containing program instructions embodied therein for causing a camera module in an image capture device to perform lens shading correction, the program instructions comprising:
instructions to reference, from a memory in an image capture device, a plurality of base surface measurements based on a plurality of spectral scans of a camera module type generated under a plurality of illuminants, and a plurality of images generated under conditions simulated to correspond to the plurality of illuminants;
instructions to reference, from the memory, a shading profile specific to the camera module of the camera module type to calculate a module-specific calibration surface, the shading profile comprising a radial component and a non-radial component;
instructions to create a module-specific corrected surface measurement for each illuminant of the plurality of illuminants based on the plurality of base surface measurements of and the module-specific calibration surface;
instructions to determine an illuminant in a scene captured by the camera module; and
instructions to apply the module-specific corrected surface measurement corresponding to the determined illuminant to an image data corresponding to the scene,
wherein, the instructions to reference the plurality of base surface measurements comprises instructions to generate a spectral scan with a monochromator of a camera module corresponding to the camera module type.

38. The device according to claim 37, wherein the image capture device is comprised in a mobile telephone.

* * * * *